US006898358B2

(12) United States Patent
Li et al.

(10) Patent No.: US 6,898,358 B2
(45) Date of Patent: May 24, 2005

(54) ADJUSTABLE PHOTONIC CRYSTAL AND METHOD OF ADJUSTING THE INDEX OF REFRACTION OF PHOTONIC CRYSTALS TO REVERSIBLY TUNE TRANSMISSIONS WITHIN THE BANDGAP

(75) Inventors: Ming Li, Chelmsford, MA (US); Makoto Ishizuka, Belmont, MA (US); Daniel Hogan, Acton, MA (US); Xinbing Liu, Acton, MA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 218 days.

(21) Appl. No.: 10/328,841

(22) Filed: Dec. 24, 2002

(65) Prior Publication Data

US 2003/0231822 A1 Dec. 18, 2003

Related U.S. Application Data

(60) Provisional application No. 60/384,576, filed on May 31, 2002.

(51) Int. Cl.[7] .............................. G02B 6/00; H04J 14/02
(52) U.S. Cl. ....................... 385/122; 385/129; 385/130; 385/131; 398/79; 398/82
(58) Field of Search ........................... 385/122, 14, 129, 385/130, 131, 132; 398/79, 82

(56) References Cited

U.S. PATENT DOCUMENTS

| 5,268,919 A | 12/1993 | Hongu et al. .................. 372/67 |
| 5,417,897 A | 5/1995 | Asakawa et al. ............. 264/22 |
| 5,706,305 A | 1/1998 | Yamane et al. ............... 372/82 |
| 5,744,780 A | 4/1998 | Chang et al. .......... 219/121.73 |
| 6,058,127 A | 5/2000 | Joannopoulos et al. ....... 372/92 |
| 6,150,630 A | 11/2000 | Perry et al. ............ 219/121.68 |
| 6,211,485 B1 | 4/2001 | Burgess .................... 219/121.7 |
| 6,260,388 B1 | 7/2001 | Borrelli et al. ............. 118/728 |
| 6,542,682 B2 * | 4/2003 | Cotteverte et al. .......... 385/125 |
| 2003/0072519 A1 * | 4/2003 | Bolanos ....................... 385/16 |
| 2003/0123827 A1 * | 7/2003 | Salerno et al. .............. 385/129 |
| 2003/0202728 A1 | 10/2003 | Leonard et al. |
| 2003/0223720 A1 * | 12/2003 | Li et al. ..................... 385/129 |
| 2003/0231822 A1 * | 12/2003 | Li et al. ....................... 385/24 |
| 2004/0062505 A1 * | 4/2004 | Sugitatsu et al. ........... 385/131 |

OTHER PUBLICATIONS

Li et. al., "Fementosecond Laser Micromaching of SI . . . " The Japanese Society of Applied Physics, Part 1, No. 5A May 2001 pp. 3476–3477.*

Li et. al., "Nanostructuring in submicron–level waveguides . . . " Optics Communications DISK May 9, 2002, Sep. 2002.*

Ming Li et al., "Nanosctructing In Submicron–Level Waveguides With Femtosecond Laser Pulses" Optics Communicatios (2002), pp. 1–5 (Sep. 10, 2002).

Ming Li et al., "Femtosecond Laser Micromachining of Si–on–SiO₂ for Photonic Band Gap Crystal Fabrication", Jpn. J. Appl. Phys. vol. 40 (2001), pp. 3476–3477, Part 1, No. 5A, May 2001.

* cited by examiner

*Primary Examiner*—Brian M. Healy
(74) *Attorney, Agent, or Firm*—RatnerPrestia

(57) ABSTRACT

A photonic crystal comprising a waveguide made of material. The waveguide has a periodic set of holes. The material proximate to at least one of the holes in the periodic set of holes exhibits an index of refraction that has been modified by the application of laser energy relative to the material proximate to other holes in the periodic set of holes. The photonic crystal is tuned to temporarily transmit a specific wavelength of light to create an on-off switch for the specific wavelength. Multiple photonic crystals are used to form a multiplexer and a demultiplexer.

12 Claims, 6 Drawing Sheets

US 6,898,358 B2

ADJUSTABLE PHOTONIC CRYSTAL AND METHOD OF ADJUSTING THE INDEX OF REFRACTION OF PHOTONIC CRYSTALS TO REVERSIBLY TUNE TRANSMISSIONS WITHIN THE BANDGAP

CROSS REFERENCE TO RELATED APPLICATION

This application claims the benefit under Title 35 U.S.C. § 119(e) of U.S. Provisional Application No. 60/384,576 filed on May 31, 2002, the contents of which are incorporated herein by reference.

FIELD OF THE INVENTION

The present invention relates to photonic crystals. More particularly, it relates to photonic crystals that use destructive interference to restrict the propagation of particular wavelengths of light and that use constructive interference to permit the propagation of particular wavelengths of light, and methods for tuning the photonic crystals to reversibly adjust the wavelength at which constructive interference occurs. It also relates to the use of such photonic crystals for wavelength division multiplexing (WDM) and time division multiplexing (TDM).

BACKGROUND OF THE INVENTION

As technology advances, the volume of data around the world is growing at an exponential rate. Everything from increased usage of the global information networks (e.g. the Internet), video conferences, and mobile phones relies on efficient data transfer. Reductions in the distance that electrons need to travel within and between components have provided the dramatic increases in device speeds. Increases in the speed of electronic devices through the 1980s and 1990s largely resulted from reductions in size of microelectronic components. However, microelectronics communications networks have physical limitations that effectively limit the volume of data that can be transferred. As devices encroach upon the physical limits of component density and complexity, device reliability and speed advances for new devices are declining.

Optical communication of data (e.g., sending photons through optical fiber, rather than sending electrons through wire) is already widely implemented for certain connections and communications. Optical connections, optical switching, and all-optical circuits provide ways for photons to travel and be routed, in place of electrons traveling through electronic circuits. Wavelength division multiplexing (WDM) provides a way to send even more data through optical components (such as fiber) by mixing light of different frequencies in the same fiber. A demultiplexer separates a specific wavelength of light from a fiber.

Photonic devices and microphotonics provide significant potential for furthering the advancement of technology devices historically served by microelectronics because they also enable large volumes of data to travel along optical fibers and be routed to their final destinations. A primary reason that all-optical circuits have not yet been implemented is that there are manufacturing problems related to photonic device fabrication, such as meeting index of refraction specifications. The small feature size required for photonic devices, as well as small tolerances for physical specifications of photonic devices, have delayed the discovery and use of mass manufacturing techniques for these devices.

Photonic crystals are structures that restrict the propagation of particular wavelengths by the use of destructive interference and can be designed for very complex routing of light. While optical fiber cannot effectively route light through sharp 90-degree turns, or through complex three-dimensional devices, photonic crystals can be used for these purposes. Photonic devices in general and photonic crystals in particular are applicable to lasers, filters and light-emitting diodes and are also applicable in WDM (wavelength division multiplexing) applications. In WDM, light of many different wavelengths travels along an optical fiber and the different wavelengths of light have different destinations. Time division multiplexing (TDM) provides another way to send data through optical components. TDM is a form of multiplexing in which transmission time is broken into segments, each of which carries one element of one signal. A demultiplexer separates a specific segment of light from a fiber.

A photonic crystal may be used for a specific application which requires design control of the bandgap, those wavelengths that are "forbidden" (do not pass through the structure) and/or the narrow band of transmitted wavelengths within the "forbidden" range of wavelengths.

Photonic crystals may be 1D (one dimension), 2D (two dimension) or 3D (three dimension) periodic structures. Such periodic structures may comprise periodic holes, periodic posts, or the periodic occurrence of a particular index of refraction. Periodicity distinguishes periodic photonic crystals from other photonic devices. When the product of the lattice constant (pitch) and the index of refraction is on the order of the wavelength of the light traveling in the structures, photonic crystals usually demonstrate some unique characteristics. For example, some wavelengths are strongly enhanced and some wavelengths are strongly suppressed. These characteristics can be used to manipulate light.

One kind of photonic crystal is a photonic bandgap crystal in which light at specific "forbidden" wavelengths (those wavelengths within the photonic bandgap) are rejected by the photonic crystal. The introduction of a defect into a photonic bandgap crystal creates a narrow transmission peak where a specific, narrow band of wavelengths of light within the bandgap range is allowed to propagate while all other wavelengths within the photonic bandgap are forbidden. As the light travels through the photonic bandgap crystal, the light in the desired band of wavelengths is transmitted by the photonic crystal and routed to its destination. The range of wavelengths that do not pass through the photonic bandgap crystal may be relatively broad, for example 1300 nm–1700 nm, while the band of passed wavelengths may be relatively narrow, for example, 1625 nm–1650 nm.

Photonic devices are fabricated using the known methods of x-ray or optical lithography. X-ray and optical lithography allow manufacturers of those devices to create very small feature sizes. Currently, photonic crystals are commonly manufactured using GaAs and GaAlAs or layered Si and $SiO_2$. Alternatively, any solid-state material may be used as a photonic crystal as long as it has low absorption of the wavelength traveling in it.

SUMMARY OF THE INVENTION

The invention is embodied in a photonic crystal comprising a waveguide made of material. The waveguide has a periodic set of holes. The material proximate to at least one of the holes in the periodic set of holes exhibits an index of refraction that has been temporarily modified by application of laser energy relative to the material proximate to other ones of the holes.

BRIEF DESCRIPTION OF THE DRAWINGS

The invention is best understood from the following detailed description when read in connection with the accompanying drawings. It is emphasized that, according to common practice, the various features of the drawings are not to scale. On the contrary, the dimensions of the various features are arbitrarily expanded or reduced for clarity. Included in the drawings are the following figures.

DETAILED DESCRIPTION OF THE INVENTION

Figure 1:
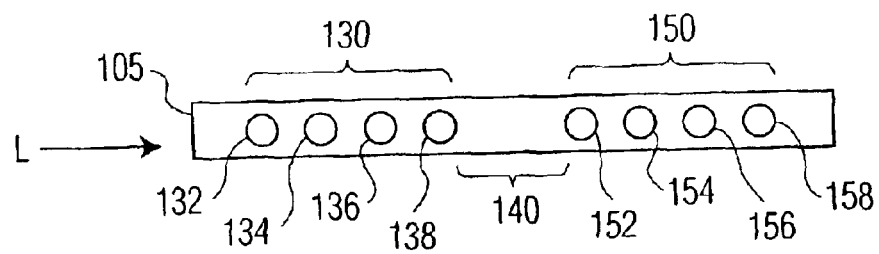
FIG. 1 is a block diagram of a prior art photonic crystal having two periodic sets of holes separated by a defect region.

Although the invention is illustrated and described herein with reference to specific embodiments, the invention is not intended to be limited to the details shown. Rather, various modifications may be made in the details within the scope and range of equivalents of the claims and without departing from the invention.

The present invention provides apparatus and a method for creating a switch to control the flow of discrete wavelengths of light by temporarily adjusting the index of refraction of a photonic crystal. This procedure allows for temporary filtering and routing of specific wavelengths of light. Photonic crystals may be precisely tuned to achieve an improved separation between wavelengths and to temporarily create or modify a photonic bandgap defect to routing specifications. Such photonic crystals temporarily pass only the desired wavelength because of constructive interference caused by the temporarily imposed defect.

The photonic crystal may be made of a material that is light transmissive in the wavelength band of interest. The light transmissive material may be a crystalline material or an amorphous material. The index of refraction may be related to the electronic structure or the lattice structure of the material and thus directs the behavior of light within that material. Therefore, adjustments to material properties of a photonic crystal also adjust its index of refraction, resulting in an effect on the behavior of light in the photonic crystal.

The index of refraction of a photonic crystal may be precisely tuned so that the selected wavelength, or wavelengths, are either forbidden or transmitted. As described below, the index of refraction of material from which the photonic crystals are made may be accurately and precisely adjusted. Furthermore, a variation in the physical dimensions of a photonic crystal may be used to alter the bandgap and/or defect state(s), altering the transmission through the structure. A defect may be, for example, a break in periodicity of holes in the photonic crystal such as a missing hole. Because such adjustments may be implemented temporarily, a photonic crystal may act as a switch that temporarily allows light of one or more specific wavelengths to be transmitted. Alternatively in TDM, the crystal may allow light of a particular wavelength to be transmitted for a specific, predetermined period of time.

Laser tuning of photonic crystals is preferred because the feature sizes of photonic crystals for the 1.55 micron telecommunication wavelength are very small and are usually measured in nanometers. It is difficult, however, to achieve design specifications of photonic crystals using conventional MEMS technologies. The tuning capabilities of a laser are desirable to meet these specifications. The present invention provides a manufacturing method for mass producing photonic crystals having predetermined specifications. It also provides a way to precisely and temporarily adjust the index of refraction of a photonic crystal to temporarily produce constructive interference at a target wavelength.

FIG. 1 is a block diagram of a prior art photonic crystal 105 used as a waveguide for light. Photonic crystal 105 is a conventional structure for manipulating the flow of laser light. It is a one-dimensional structure of Si-on-SiO$_2$. While exemplary embodiments of the invention are shown and described herein, it will be understood that such embodiments are provided by way of example only. Numerous variations, changes and substitutions will occur to those skilled in the art without departing from the invention. Light may traverse the photonic crystal waveguide from left to right as shown by arrow L in FIG. 1. It will be understood that light may also traverse the photonic crystal from right to left. Photonic crystal 105 has a first linear periodic set of holes 130 and a second linear periodic set of holes 150. The first linear periodic set of holes 130 has four holes, 132, 134, 136, and 138. The second linear periodic set of holes 150 has four holes, 152, 154, 156, and 158. Between the last hole 138 in the first periodic set of holes 130 and the beginning hole 152 in the second periodic set of holes 150 is a break in the periodic nature of the two sets of holes. The break constitutes a linear defect region 140.

In this prior art photonic crystal, each of the holes in each periodic set of holes may be formed using femtosecond laser pulses with a wavelength of 775 nm. In an alternative prior art embodiment, each of the holes may be formed using femtosecond laser pulses with a wavelength of 387 nm. When 387 nm laser light is used, holes may be obtained as small as 160 nm in diameter and the pitch (the distance between the centers of adjacent holes) may be 420 nm.

In operation, light is introduced into one end of photonic crystal 105. As the light propagates through photonic crystal 105, defect region 140 allows a specific band of wavelengths to pass through photonic crystal 105 while other wavelengths within the photonic bandgap are precluded from passing through. In an exemplary embodiment, photonic crystal 105 may allow light in a narrow band centered around a wavelength of 1.650 $\mu$m to pass through. Destructive interference prevents other wavelengths within the bandgap from passing through photonic crystal 105. Each of the holes is a scattering center. Only a narrow band centered around a particular wavelength can scatter off the holes and have constructive interference at the output. In the exemplary embodiment, the center wavelength may be 1.650 $\mu$m and the narrow band may be about 1.640 $\mu$m to about 1.660 $\mu$m or from about 1.645 $\mu$m to about 1.655 $\mu$m.

Figure 2A:
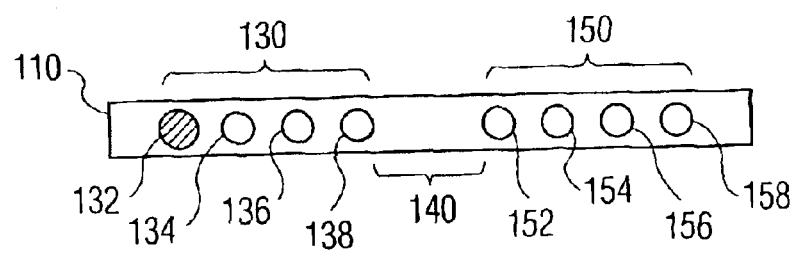
FIG. 2A is a block diagram of a photonic crystal having two periodic sets of holes separated by a defect region wherein the first hole has been temporarily modified.

FIG. 2A is a block diagram of an exemplary embodiment of a photonic crystal 110 according to the present invention. This embodiment has two periodic sets of holes separated by a defect region wherein the first hole 132 has been modified. Modified hole 132 may have been modified by application of laser energy. The placement of modified hole 132 in photonic crystal 110 affects both the transmission efficiency and the wavelength of light that is passed by photonic crystal 110. The placement of the modified hole causes a measurable change in the transmission efficiency and the wavelength, in nanometers, of light passed through the photonic crystal 110. The measurable change is caused because the modified hole impacts the interference with light waves passing through photonic crystal 110.

Hole 132 in photonic crystal 110 may be modified in two different ways. Before describing those ways, we will first explain the relationship between the application of various amounts of laser energy to a photonic crystal and changes in the nature of the area of the photonic crystal that is impacted by the application of the laser energy.

The inventors have determined that laser energy may be used to adjust the index of refraction of a photonic crystal. Intense femtosecond laser pulses excite the dense electron-hole plasma in a material, which causes changes in band structure and can lead to structural transitions. A material, which may be a standard semiconductor material such as Si, Ge, and various III/V materials, may be subjected to various levels of laser energy. Examples of III/V materials which may be used include GaAs, AlGaAs, InSb, InGaAsP, and InP. Other materials such as glass, quartz, SiN, $Al_2O_3$, fused silica or plastic may also be used. The key factors of the material are 1) that it not absorb significant amounts of the light being filtered and 2) that it's index of refraction be relatively constant across the photonic crystal. Studies of the impact of various levels of laser energy on GaAs show that the fluence threshold for permanent damage to GaAs, $F_{th}$, is about 1.0 kJ/m². That is, permanent damage is caused to the GaAs when laser energy equal to or above the threshold level $F_{th}$ is applied to the GaAs. Other levels of laser energy result in different effects upon the GaAs. For example, laser energy substantially above $F_{th}$ results in vaporizing the material, thereby leaving a hole in place of the vaporized material. Each of the other materials also have a $F_{th}$ that is unique to each material.

When laser energy is applied to a material below $F_{th}$, there are three distinct regimes of behavior, resulting in three different states of the structure. When the material is crystalline, the first state is lattice heating which takes place when laser energy at less than 0.5 $F_{th}$ is applied to the crystalline material. The second regime is the application to the material of laser energy in the range of 0.6 to 0.8 $F_{th}$. Lattice disordering takes place at this level of laser energy. Application of this level of laser energy effectively changes the lattice structure of the crystalline material from a material having a structured lattice makeup to an unstructured lattice configuration; i.e., to a glass structure. The third regime is the application to the crystalline material of laser energy from 0.8 to 1.0 $F_{th}$. At this level of laser energy, the crystalline material undergoes a semiconductor-to-metal transition.

When laser energy is applied to an amorphous material such as glass, only the third regime may cause a change in its structure. That is, application of laser energy from 0.8 to 1.0 $F_{th}$ may cause the material to undergo a glass-to-metal transition.

Applications of laser energy at levels below $F_{th}$ cause only reversible changes. Accordingly, application of laser energy to a material in the 0.6 to 0.8 $F_{th}$ range changes the photonic crystal to a glass phase and changes the crystal's index of refraction to the index of refraction of the glass phase for a short period of time. After that time period expires, the crystal reverts to its previous lattice structure and previous index of refraction. Similarly, application of laser energy to a material in the 0.8 to 1.0 $F_{th}$ range changes the photonic crystal to a metal phase and changes the crystal's index of refraction to the index of refraction of the metal phase for a short period of time. After that time period expires, the crystal reverts to its previous index of refraction and lattice structure.

When glass or other amorphous material is used, application of laser energy to that material in the 0.8 to 1.0 $F_{th}$ temporarily changes the photonic crystal and its index of refraction to that of the metal phase.

When laser energy at a level below $F_{th}$ is applied, the photonic crystal may begin to transport the permitted wavelength after a time interval on the order of picoseconds. When the application of laser energy below $F_{th}$ is stopped, transmission of the selected wavelength may stop after a time interval on the order of picoseconds. Initiation and cessation of the transmission of the selected wavelength within such short time lengths allows a photonic crystal to be used as a light switch.

Returning to FIG. 2A, hole 132 may be temporarily modified by applying laser energy directly at hole 132 of photonic crystal 110 and an area of photonic crystal 110 proximate to hole 132. The first type of modification may be accomplished by applying an amount of laser energy that is in the range of 0.6 to 0.8 $F_{th}$ of the material from which the photonic crystal is made. Application of the 0.6 to 0.8 $F_{th}$ level of laser energy temporarily modifies the material proximate to hole 132. Application of that level of energy to hole 132 results in the temporary formation of an annulus of temporarily modified material around the outside of hole 132. Since the temporary annulus is formed around the outside of hole 132, the diameter of the temporary annulus is greater than the diameter of hole 132. In an exemplary embodiment, the diameter of the temporary annulus is in a range of about 1% to about 5% larger than the diameter of hole 132.

Before the level of energy, 0.6 to 0.8 $F_{th}$, is applied to hole 132, the index of refraction proximate to hole 132 is the index of refraction of the material from which the photonic crystal is made. As a result of the application of the 0.6 to 0.8 $F_{th}$ level of energy, the molecular structure of the annulus is temporarily changed, thereby also temporarily changing the index of refraction of the temporary annulus. Consequently, the material other than the temporary annulus exhibits a first lattice structure (e.g. crystal) and a first index of refraction while the material of the temporary annulus temporarily exhibits a second lattice structure (e.g. glass) and a second index of refraction. In an exemplary embodiment, as a result of applying laser energy at 0.6 to 0.8 $F_{th}$ to hole 132, the exemplary material comprising the temporary annulus may be temporarily changed to an amorphous glass phase.

The second type of modification that may be applied to hole 132 is the application of laser energy that is in the range of 0.8 to 1.0 $F_{th}$. When such a level of laser energy is applied to hole 132, hole 132 is temporarily modified to form a temporary metal-phase annulus around hole 132. In an exemplary embodiment, the diameter of the temporarily modified material is in a range of about 1% to about 5% larger than the diameter of hole 132.

This modification of hole 132 therefore also results from the application of laser energy and causes the wavelength of the transmitted light to change. In addition, this type of modification is also a modification of the index of refraction of the annular area proximate to hole 132. Before the application of laser energy, the index of refraction of the material proximate to hole 132 exhibited a first index of refraction. After the application of laser energy in the range of 0.8 to 1.0 $F_{th}$, the index of refraction of the temporarily modified portion changes from the index of refraction of the material to the index of refraction of the metal phase material.

Regardless of how the enlargement of hole 132 is accomplished, the specific narrow wavelength band that may be passed by photonic crystal 110 will be different from the narrow wavelength band that may be passed by photonic crystal 105.

Figure 2B:
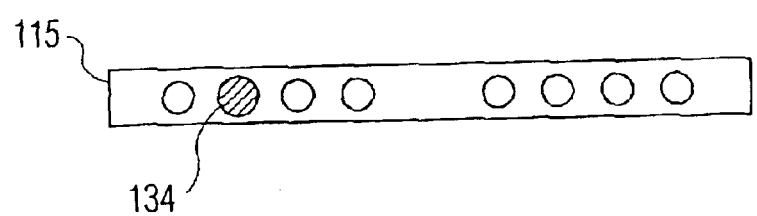
FIG. 2B is a block diagram of a photonic crystal having two periodic sets of holes separated by a defect region wherein the second hole has been temporarily modified.
Figure 2C:
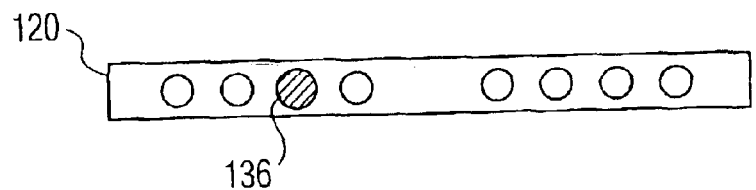
FIG. 2C is a block diagram of a photonic crystal having two periodic sets of holes separated by a defect region wherein the third hole has been temporarily modified.
Figure 2D:
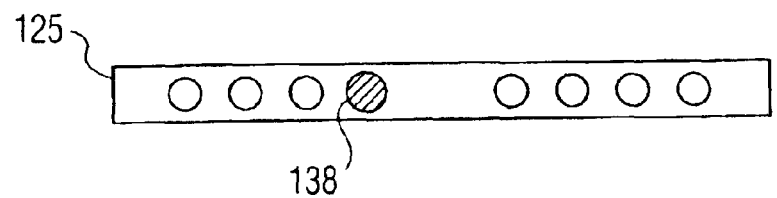
FIG. 2D is a block diagram of a photonic crystal having two periodic sets of holes separated by a defect region wherein the fourth hole has been temporarily modified.

FIGS. 2B, 2C, and 2D show other embodiments of photonic crystals that may be temporarily structurally modified. Each temporary modification results in the respective photonic crystal being tuned to temporarily allow transmission of a narrow wavelength band that is different than the narrow wavelength bands transmitted by the other embodiments. As shown in FIG. 2B, for example, hole 134 may be temporarily modified by application of laser light in one or both of the same ways as hole 132 may be temporarily modified. Whereas hole 132 in photonic crystal 110 may be the hole at the extreme left of the periodic set of holes 130, hole 134 may be the second hole, counting from the left, in periodic set of holes 130. Hole 134 and the material proximate to hole 134 may be temporarily modified by application of laser light in the amount of 0.6 to 0.8 $F_{th}$. After the application of that level of laser light, a temporary annulus is formed around hole 134 having a molecular structure and an index of refraction that has been temporarily modified by the application of the laser energy. In an exemplary embodiment, the diameter of the temporary annulus may be in a range of about 1% to about 5% larger than the diameter of hole 134. Alternatively, laser light may be applied to hole 134 in the range of 0.8 to 1.0 $F_{th}$. When that amount of laser energy is applied, a portion of the material proximate to and surrounding hole 134 is temporarily modified, again temporarily changing the index of refraction to that of metal and, as a result, the narrow wavelength band of the light that may temporarily be transmitted by the photonic crystal.

FIGS. 2C and 2D show embodiments in which holes 136 and 138, respectively, may be modified by application of laser light in either of the ways previously explained with respect to FIGS. 2A and 2B. As before, these modifications temporarily change the molecular structure, and/or index of refraction, and, thus, the narrow wavelength band of transmitted light.

Figure 3:
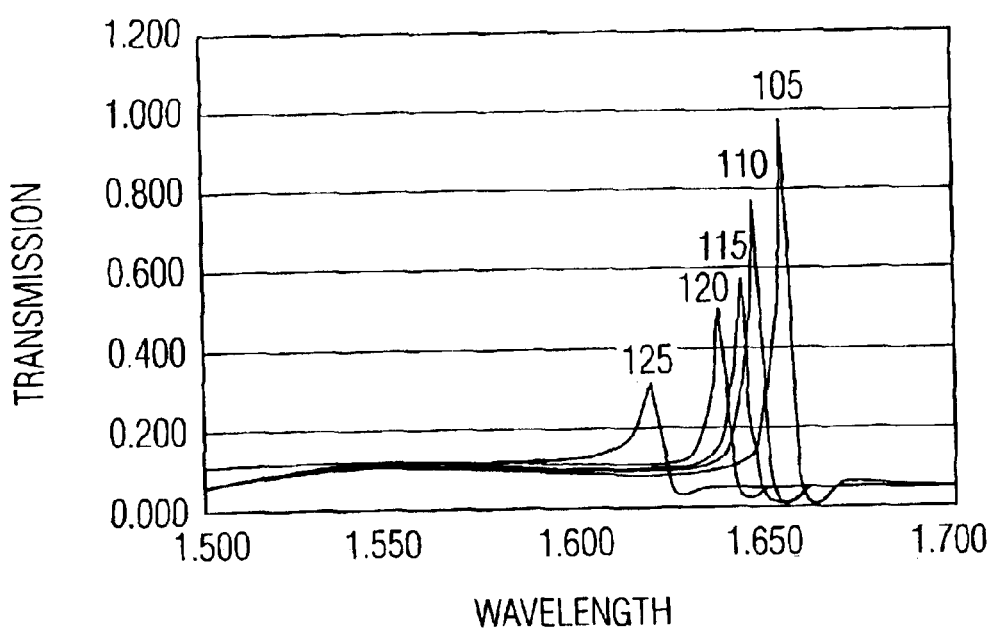
FIG. 3 is a graph showing the effect on transmitted wavelengths of light caused by having the different modified holes shown in FIGS. 2A, 2B, 2C, and 2D.

In addition to changing the wavelength of light transmitted in photonic crystals when holes are modified, the placement of modified holes has an effect on transmission efficiency which, in turn, is proportional to the finesse of the device which is proportional to the quality or Q of the filter implemented by the device. The results of changing the placement of a modified hole in a photonic crystal are shown in FIG. 3. FIG. 3 shows that changes in the placement of a modified hole in a photonic crystal causes temporary measurable changes in the transmission efficiency, as well as in the wavelength, of the transmitted light. Graph 105 in FIG. 3 shows that photonic crystal 105 may temporarily transmit light having a 1.650 µm wavelength with 1.0 efficiency. Graph 110 shows that photonic crystal 110, with modified hole 132, may temporarily transmit light having a wavelength of about 1.642 µm with less than 0.8 efficiency. Graph 115 shows that photonic crystal 115, with modified hole 134, may temporarily transmit light having a wavelength of about 1.640 µm with less than 0.6 efficiency. Graph 120 shows that photonic crystal 120, with modified hole 136, may temporarily transmit light having a wavelength of about 1.632 µm with approximately 0.5 efficiently. Graph 125 shows that photonic crystal 125, with modified hole 138, may temporarily transmit light having a wavelength of about 1.616 µm with less than 0.4 efficiency.

Depending upon how and where a photonic crystal is initially tuned, before any temporary modifications are made, it may be desirable to make a permanent change in addition to a temporary change. FIGS. 2A to 2D and FIGS. 2E to 2I, described below, are embodiments which may also be implemented to make permanent changes in a photonic crystal before temporary modifications are implemented.

Figure 2E:
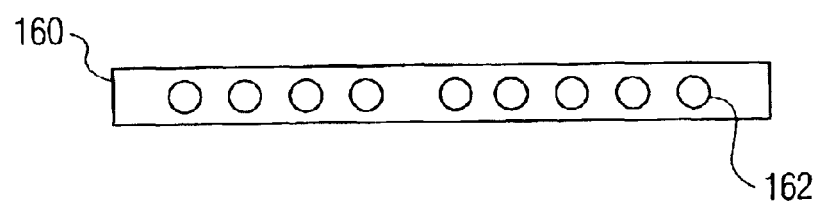
FIG. 2E is a block diagram of a photonic crystal having two periodic sets of holes separated by a defect region wherein one of the periodic sets of holes has more holes than the other periodic set of holes.

FIG. 2E is a block diagram of yet another embodiment of the invention. It shows a photonic crystal 160 with two linear periodic sets of holes. One of the periodic sets of holes has four holes and the second set of the periodic sets of holes has a fifth hole 162. The addition of an extra hole provides a first change to the index of refraction of photonic crystal 160 and the wavelength of light transmitted by photonic crystal 160 as compared with the index of refraction and wavelength of light transmitted by photonic crystal 105. In a modified embodiment, one hole may be added to each end of the photonic crystal. This modified embodiment is shown in FIG. 2H where photonic crystal 165 contains the two periodic sets of holes with additional holes 162 and 164 added to the ends of the photonic crystal. One of the holes may then be temporarily modified by application of laser energy to temporarily change the molecular structure, the index of refraction, and the wavelength transmitted by the crystal.

Adding a hole at one end or a hole at both ends gives a dramatic change. When additional holes are added symmetrically, at the same pitch as the other holes, to each end of the photonic crystal, the added holes give better confinement of the light thereby increasing the efficiency of the photonic crystal and narrowing the range of the wavelengths that are transmitted within the bandgap. That is, the additional hole at each end of a photonic crystal increases the Q (the quality and the selectivity) of the filter implemented by the structure. Referring to graph 125 in FIG. 3, for example, the addition of a hole at each end of a photonic crystal may narrow the range of transmitted frequencies so that a graph of the band of transmitted wavelengths may have a transmission peak shape more like graphs 110, 115, or 120 than graph 125 without substantially changing the peak transmitted wavelength.

Figure 2F:
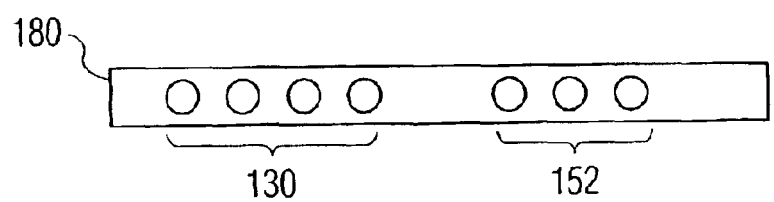
FIG. 2F is a block diagram of a photonic crystal having two periodic sets of holes separated by a defect region wherein one of the periodic sets has a fewer number of holes than the other set.

FIG. 2F is a block diagram of another embodiment of the invention. It shows a photonic crystal 180 with two linear periodic sets of holes. Periodic set of holes 130 has four holes and periodic set of holes 152 has three holes. Therefore, photonic crystal 180 depicts a photonic crystal 180 in which a hole has been removed. The removal of a hole from photonic crystal 105 depicted in FIG. 1, changes the index of refraction of photonic crystal 180 and the wavelength of light transmitted by photonic crystal 180 as compared with the index of refraction and wavelength of light transmitted by photonic crystal 105. As above, one of the holes may then be temporarily modified by application of laser energy, resulting in the same kinds of temporary changes.

Figure 2G:
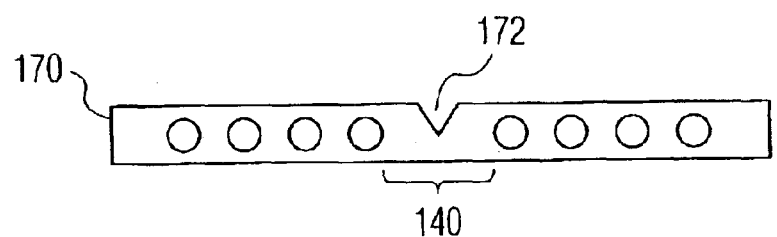
FIG. 2G is a block diagram of a photonic crystal having two periodic sets of holes separated by a defect region wherein there is a notch in the defect region.
Figure 2H:
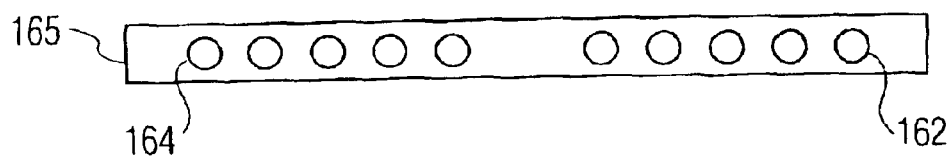
FIG. 2H is a block diagram of a photonic crystal having two periodic sets of holes separated by a defect region wherein an extra hole has been added at each end of the crystal.

FIG. 2G is a block diagram of another embodiment of the invention. It shows a photonic crystal 170 with two linear periodic sets of holes. In this embodiment, defect region 140 has been modified by forming a notch 172 in the surface of defect region 140 in proximity to one of the periodic sets of holes. The notch is formed by the application of laser energy to a portion of the surface of photonic crystal 170. Application of laser energy to form the notch 172 changes the index of refraction at the area of the notch and, therefore, changes the index of refraction of photonic crystal 170 as well as the wavelength of light transmitted by photonic crystal 170 as compared with the index of refraction and wavelength of light transmitted by photonic crystal 105. Again, one of the holes may be temporarily modified by the application of laser energy resulting in the same kinds of temporary changes.

Figure 2I:
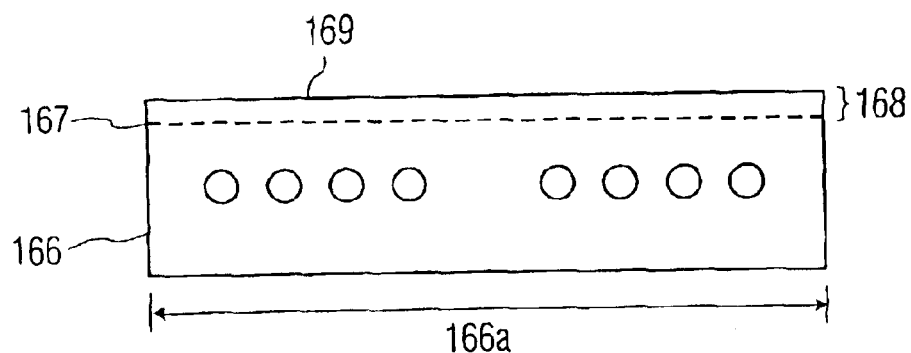
FIG. 2I is a block diagram of a photonic crystal having two periodic sets of holes separated by a defect region wherein a portion of the crystal has been trimmed along its entire width.

FIG. 2I shows another embodiment of a modified photonic crystal. Referring to FIG. 2I, the entire width of the photonic crystal may be trimmed instead of just making a notch as shown in FIG. 2G. For example, in photonic crystal 166 shown in FIG. 2I, the width of the crystal is designated as 166a. Dashed line 167 across width 166a and the area 168 between the edge 169 and the dashed line 167 shows an area that may be trimmed by the application of laser energy to the trimmed area. Trimming this area may modify the index of refraction of the trimmed area and, therefore, may also modify the wavelength that is transmitted.

In another embodiment, the structure and the index of refraction of an entire photonic crystal may be temporarily changed by passing laser light across the entire crystal resulting in a temporary wavelength shifted, high Q filter. The method of passing laser light across the entire crystal may be applied to any of the photonic crystals discussed above: the photonic crystals shown in FIGS. 1, 2A through 2I. The method may also be applied to the photonic crystals shown in FIGS. 4 and 5 which are described below. Application of a sufficiently high amount of laser energy may, for example, change the molecular structure of the entire photonic crystal to glass in one embodiment, or to metal, in another embodiment. After laser light is applied across an entire photonic crystal, the narrow band of wavelengths transmitted by the photonic crystal may be further modified in accordance with the teachings of the other embodiments. For example, one or more holes may be temporarily modified as described above.

Figure 4:
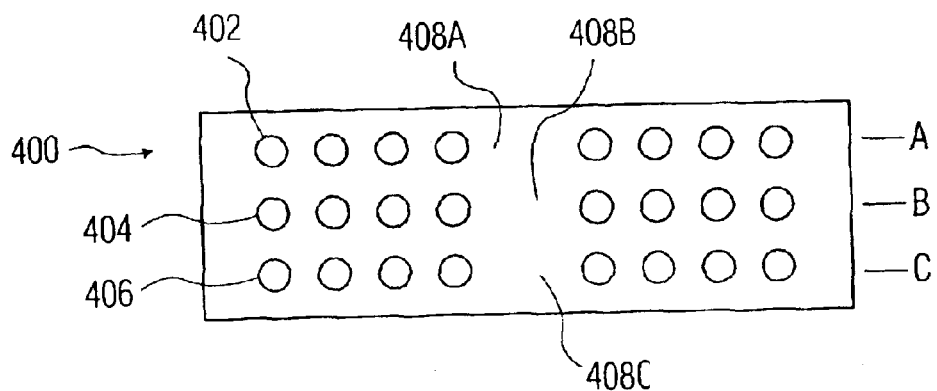
FIG. 4 is a block diagram of a photonic crystal having a plurality of rows of periodic sets of holes.

FIG. 4 is another embodiment of the invention. FIG. 4 depicts a two dimensional photonic crystal 400 having a plurality of holes arranged in rows A, B, C. The exemplary embodiment depicted in FIG. 4 shows three rows of holes. It will be understood that other embodiments of a two dimensional photonic crystal may have fewer rows or more rows. Each row of holes has two linear periodic sets of holes and a defect region between the two sets on each row. Row A has defect region 408A. Row B has defect region 408B. Row C has defect region 408C. In order to temporarily change the index of refraction of photonic crystal 400 and to temporarily change the narrow wavelength band of light that is transmitted by it, any of the holes 402, 404 and 406 may be modified by application of laser energy. In yet another embodiment, any two of holes 402, 404, or 406 may be modified. In still another embodiment, all three holes may be modified. In each case, the index of refraction of photonic crystal 400 may be temporarily changed in comparison to photonic crystal 400. In other embodiments, modifications to additional holes may change the wavelength of light that is transmitted.

It will be understood that modification of hole 402 may temporarily modify the narrow transmitted wavelength band only for row A; that modification of hole 404 may temporarily modify the narrow transmitted wavelength band only for row B; and that modification of hole 406 may temporarily modify the narrow transmitted wavelength band only for row C.

Figure 5A:
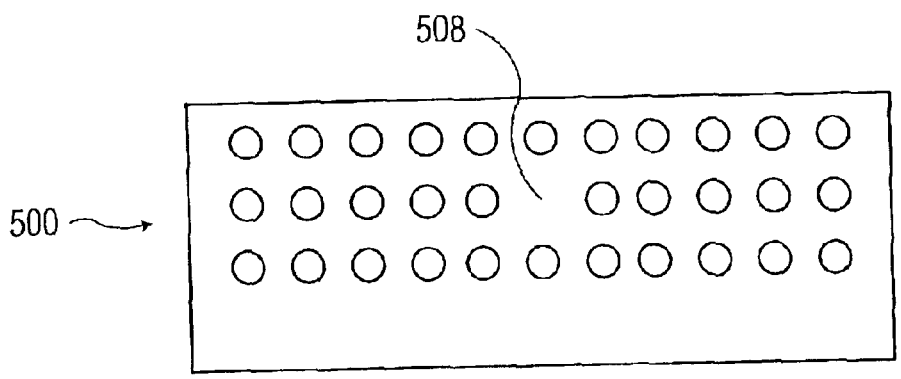
FIG. 5A is a block diagram of a photonic crystal having a plurality of rows of periodic sets of holes and a modified defect region.

FIG. 5A shows yet another embodiment of the invention. This embodiment shows a two dimensional photonic crystal having a plurality of linear periodic rows of holes and with a modified defect region 508. In this embodiment, only one row has a defect region 508 which is created by not forming a hole in the defect region. In this embodiment, none of the other rows of holes has a defect region. It will be understood that the embodiment shown in FIG. 5A may be further temporarily modified by application of laser energy in accordance with the embodiments disclosed above. For example, an annulus may be formed around one or more of the holes.

Any or all of the embodiments may be used as a switch in a multiplexer or in a demultiplexer to combine wavelengths of light to form a multiplexed beam or to take wavelengths of light away from a multiplexed beam. In the case of a demultiplexer, a multiplexed light beam may be directed through photonic crystal 110, for example. At a predetermined time, laser energy in the range of 0.6 to 0.8 $F_{th}$, may be applied to hole 132 temporarily forming a glass annulus around hole 132. While the annulus exists, the lattice structure and the index of refraction of the annulus is modified thus allowing a specific narrow band of wavelengths of light to pass. As soon as the annulus reverts to its original structure and index of refraction, photonic crystal 110 stops transmitting the specific narrow band of light within the bandgap because the transmission band has shifted to longer wavelengths. Accordingly, photonic crystal 110 acts as a switch allowing a specific wavelength of light to pass, for the short time that the annulus exists.

Figure 5B:
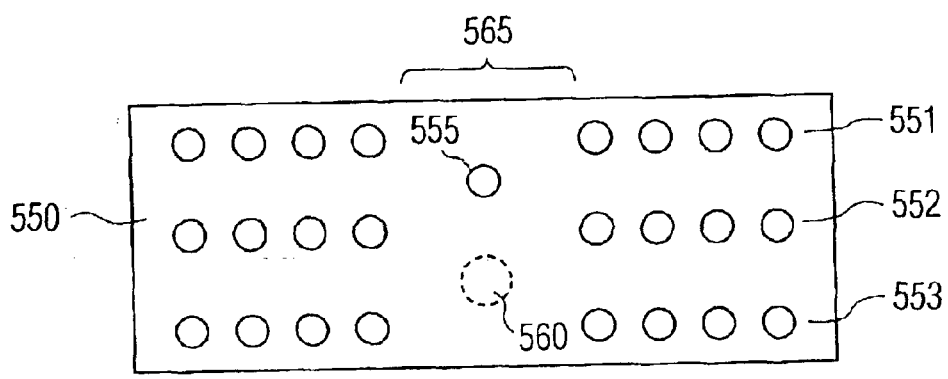
FIG. 5B is a block diagram of a photonic crystal having a plurality of rows of periodic sets of holes wherein one or more additional holes are added in an area that does not line up with any of the plurality of rows of periodic sets of holes.

FIG. 5B shows yet another embodiment of the invention. This embodiment shows another example of a two dimensional photonic crystal having a plurality of linear periodic rows of holes 551, 552, 553. In this embodiment, hole 555 may be added in a defect region 565 that exists generally between the various periodic rows of holes. Hole 555 may, however, be placed so that it does not line up with any of the holes in any of the periodic rows of holes 551, 552, 553. FIG. 5B shows an embodiment in which hole 555 may be placed in an area defined by defect region 565 and the space between rows 551 and 552. In an alternative embodiment, a hole may be placed in an area defined by defect region 565 and the space between rows 552 and 553. Such a hole is designated by dashed hole 553. In yet another embodiment, both of the holes 555 and 560 may be placed in the defect region. Furthermore, as explained above, any of the modifications described above may be made to any, or all, of the holes in the embodiments shown in FIG. 5B.

Any or all of the embodiments shown in FIGS. 2 through 5B may be used as one or more switches in a multiplexer or in a demultiplexer to combine different wavelengths of light to form a multiplexed beam or to take different wavelengths of light away from a multiplexed beam.

Figure 6:
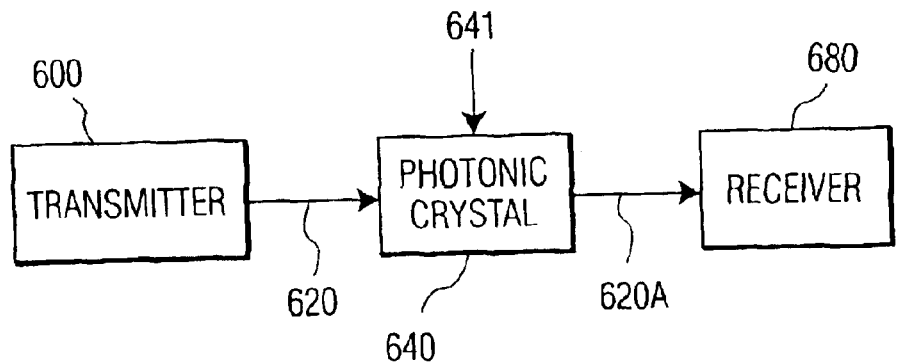
FIG. 6 is a block diagram of an exemplary embodiment of a light transmission system using a photonic crystal as an on-off switch.

FIG. 6 is a block diagram of an exemplary embodiment of a light transmission system using a photonic crystal as an on-off switch. In FIG. 6, light transmitter 600 transmits a beam of light 620 toward a receiver of light 680. Light beam 620 may comprise a single wavelength or may be a multiplexed beam of light comprising many different wavelengths. Photonic crystal 640 is placed between transmitter 600 and receiver 680 in order to control when, and for how long, the desired wavelength light beam will be received by receiver 680. Photonic crystal 640 may be any one of the photonic crystals described in connection with FIGS. 2 through 5B above. In order to exercise control over light beam 620, photonic crystal 640 is initially and permanently tuned to wavelengths less than the desired wavelength. When it is desired to transmit the desired wavelength, tuning laser light 641 in a predetermined amount less than $F_{th}$ may be directed toward photonic crystal in order to temporarily modify the molecular structure of photonic crystal so that it passes the desired wavelength of light, beam 620A.

Photonic crystal 640 may pass desired wavelength light beam 620A as long as the appropriate amount of tuning laser light 641 is incident upon it. When the tuning laser light 641 is removed from photonic crystal 640, it no longer transmits the desired wavelength and turns off, thereby preventing transmission of any light from light beam 620 to receiver 680. The length of time that photonic crystal 640 transmits the desired wavelength may be controlled by the length of time that the appropriate amount of tuning laser light 641 is incident upon photonic crystal 640.

The embodiment in FIG. 6 may also be used for TDM by applying the appropriate amount of laser energy to photonic crystal 640 for various discrete periods of time at specific predetermined times. When used for such a purpose, transmitter 600 may supply a multiplexed signal 620 to photonic crystal 640. Using tuning laser light 641, photonic crystal 640 may, for example, be tuned to allow transmission of channel 1 of the multiplexed signal 620. Tuning laser light 641 may be clock pulse synchronized with channel 1 in the multiplexed signal. Channel 1 may exit photonic crystal 640 as signal 620A and be received by receiver 680. By delaying the clock pulsed tuning laser light 641, photonic crystal 640 may be synchronized with channel 2 of the multiplexed signal in order to transmit channel 2 to receiver 680. A further delay of the tuning laser light 641 may synchronize photonic crystal 640 with channel 3 of the multiplexed signal in order to transmit channel 3 to receiver 680. It will be understood that the system shown in FIG. 6 may be used to demultiplex, and transmit, more than three channels.

Figure 7:
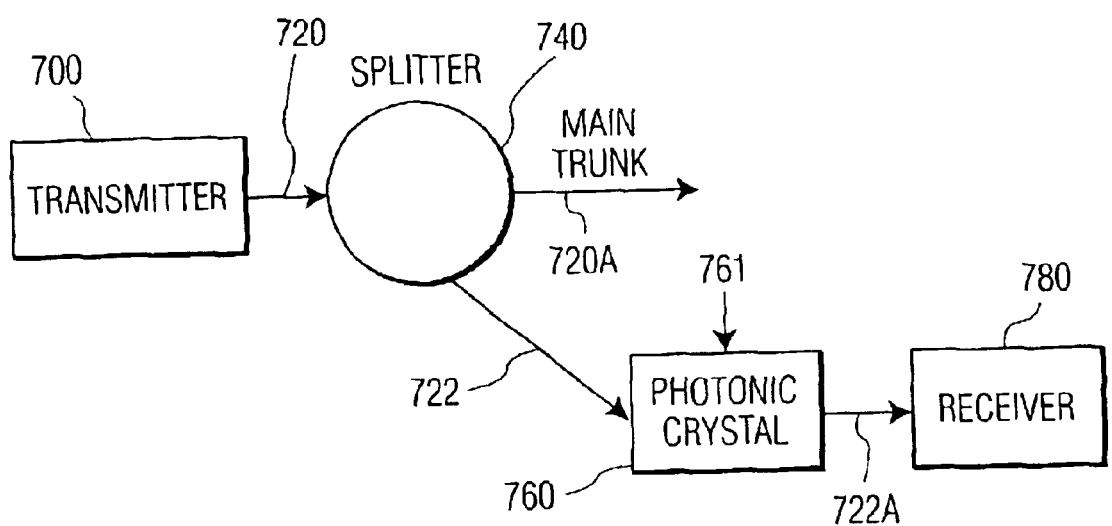
FIG. 7 is a block diagram of another embodiment of a light transmission system using a photonic crystal as an on-off switch.

FIG. 7 is a block diagram of another embodiment of a light transmission switch system. A beam of light 720 may be transmitted by light transmitter 700. Light beam 720 may comprise light of a single wavelength or it may be a multiplexed light beam comprising a plurality of wavelengths. Light beam 720 may be incident upon light splitter 740. Embodiments of light splitter 740 may use either spliced fibers or a star splitter. Light splitter 740 may divide light beam 720 into two separate light beams, 720A and 722.

In an embodiment where light beam 720 comprises light of a single wavelength, light beams 722 and 720A may be the same single wavelength. One output from splitter 740 may be light beam 722 and another output from splitter 740 may be light beam 720A. The power of light beam 722 is desirably less than the power contained in light beam 720A. The remainder of the power of light beam 720 may be transmitted along a main trunk as light beam 720A to another destination (not shown). Reduced power light beam 722 may be incident upon photonic crystal 760, which may act as an On-Off switch when the appropriate amount of laser energy is incident upon it. When the appropriate amount of tuning laser light 761 is incident upon photonic crystal 760, it transmits light beam 722A toward receiver 780. Light beam 722A is the same wavelength as light beam 722 and may be transmitted at the same level of energy as light beam 722 is transmitted. Since, in this embodiment, light beam 720 may be a light beam of a single wavelength, this embodiment may transmit the single wavelength light beam 722A to receiver 780 through photonic crystal 760 while the remaining power of light beam 720 is directed to other uses through main trunk light beam 720A.

Photonic crystal 740 may pass desired wavelength light beam 722 as long as the appropriate amount of tuning laser light 761 is incident upon it. When the tuning laser light 761 is removed from photonic crystal 740, it no longer transmits the desired wavelength and turns off, thereby preventing transmission of any light from light beam 720 to receiver 780. The length of time that photonic crystal 740 transmits the desired wavelength may be controlled by the length of time that the appropriate amount of tuning laser light 761 is incident upon photonic crystal 740.

In an alternative embodiment, the embodiment shown in FIG. 7 may be used when light beam 720 is a multiplexed light beam including light of a plurality of wavelengths. In this embodiment, splitter 740 may divide light beam 720 into two beams. First light beam 722 may be light of a specific wavelength. Second light beam 720A may be a main trunk light beam. Light beam 722 may be incident upon photonic crystal 760. When an appropriate amount of tuning laser light 761 is incident upon photonic crystal 760, photonic crystal may transmit light beam 722A of a predetermined wavelength to receiver 780. When the tuning laser light 761 is no longer incident upon photonic crystal 760, light beam 722A at the selected wavelength is no longer received by receiver 780.

When the appropriate amount of tuning laser light 761 is not incident upon photonic crystal 760, splitter 740 passes all of the energy of the complete multiplexed light beam 720 as main trunk light beam 720A. When the appropriate amount of tuning laser light 761 is incident upon photonic crystal 760 and the photonic crystal transmits light of the predetermined wavelength, the light beam 720A may transmit the main trunk multiplexed light beam without the energy that is being transmitted as light beam 722A. When the appropriate amount of tuning laser light 761 is no longer incident upon photonic crystal 760, photonic crystal may no longer transmit desired wavelength light beam 722A. As a result, receiver 780 may no longer receive predetermined wavelength light beam 722A and main trunk multiplexed light beam 720A will again include the previously split-off light energy. Furthermore, as explained above, this alternative embodiment may also be used as a TDM transmitter.

In yet another embodiment of the system shown in FIG. 7, receiver 780 may be a device that is able to use light that is transmitted at different wavelengths. For example, during a first time period, receiver 780 may be able to use light transmitted at a first wavelength. During a second time period, receiver 780 may be able to use light transmitted at a second wavelength. During a third time period, receiver 780 may be able to use light transmitted at a third wavelength. As shown in connection with FIGS. 2 through 5B, photonic crystal 760 may be used to transmit light at various wavelengths, depending upon the amount of tuning laser light that may be incident upon photonic crystal 760 and depending upon how photonic crystal 760 is modified by the incident laser light.

Thus, by varying the amount of tuning laser light incident upon photonic crystal 760 and/or by varying the molecular structure of photonic crystal 760, photonic crystal may be used to transmit light of different wavelengths. Accordingly, if light beam 720 is a multiplexed light beam, photonic crystal 760 may be used to divert light beam 722A of a first wavelength to receiver 780 during a first period of time. Beginning at another time, photonic crystal 760 may be used to divert light beam 722A of a second wavelength to receiver 780 during a second period of time. Beginning at yet another time, photonic crystal 760 may be used to divert light beam 722B of a third wavelength to receiver 780 during a third period of time. A single photonic crystal shown in the embodiment in FIG. 7 may thus be used as a demultiplexer.

Figure 8:
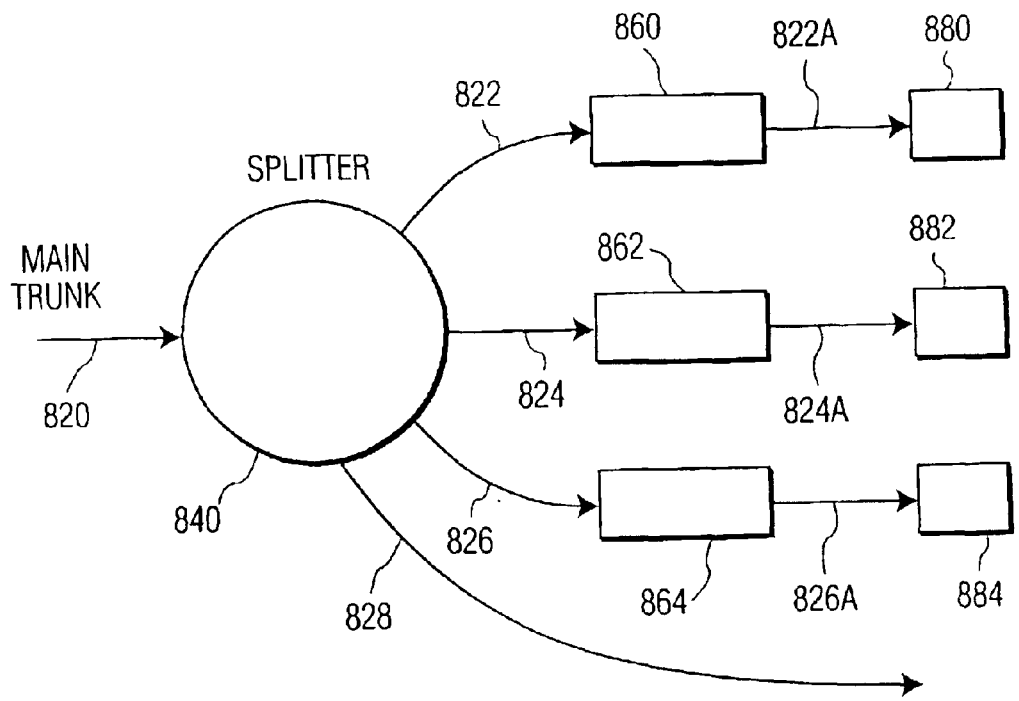
FIG. 8 is a block diagram of another embodiment of a light transmission system using a plurality of photonic crystals as on-off switches.

In another embodiment, FIG. 8 shows a main trunk multiplexed light beam 820 incident upon splitter 840 which may divide the multiplexed light beam into four light beams 822, 824, 826, 828, each of which may comprise the multiplexed light beam. It will be understood, however, that splitter 840 may create more or fewer than four light beams. First divided light beam 822 may be incident upon photonic crystal 860. Second divided light beam 824 may be incident upon photonic crystal 862. Third divided light beam 826 may be incident upon photonic crystal 864. Fourth divided light beam 828 may not be incident upon any photonic crystal. When photonic crystal 860 is switched on, it may transmit a single wavelength light beam 822A at a first wavelength to receiver 880. The first wavelength light beam 822A may be one of the wavelengths that is part of multiplexed main trunk light beam 820. When photonic crystal 862 is switched on, it may transmit a single wavelength light beam 824A at a second wavelength to receiver 882. The second wavelength light beam 824A may be one of the wavelengths that is part of multiplexed main trunk light beam 820. When photonic crystal 864 is switched on, it may transmit a single wavelength light beam 826A at a third wavelength to receiver 884. Light beam 828 may be a multiplexed light beam that is directed to another destination (e.g. another demultiplexer not shown) without first being incident upon a photonic crystal.

In one embodiment of the system shown in FIG. 8, light beams 822A, 824A, and 826A may all be the same wavelength. In another embodiment of the system shown in FIG. 8, light beam 822A may be one wavelength and light beams 824A and 826A may be the same wavelength, but different from wavelength 822A. In yet another embodiment of the system shown in FIG. 8, light beams 822A, 824A, and 826A may all be different wavelengths.

In yet another embodiment of the system shown in FIG. 8, one or more of photonic crystals 860, 862, 864 each may be tuned to more than one wavelength depending upon the amount of tuning laser light that is applied to any one of them at any given time and depending upon the changes that may be made to the structure of one or more of them. Accordingly, in various embodiments, photonic crystal 860 may be used to transmit a plurality of different wavelengths at various times, for different lengths of time; photonic crystal 862 may be used to transmit a plurality of different wavelengths at various times, for different lengths of time; photonic crystal 864 may be used to transmit a plurality of different wavelengths at various times, for different lengths of time. The wavelengths transmitted by these photonic crystals may all be the same, some of the wavelengths may be the same and some may be different, and all of the transmitted wavelengths may be different. All the embodiments described in connection with the system shown in FIG. 8 may be part of a demultiplexer system. The embodiments described in connection with FIG. 8 may be used for WDM and for TDM.

When splitter 840 is a star splitter, multiplexed beam 820 may form divided multiplexed beams 822, 826, 828 substantially simultaneously from respective output ports of splitter 840 because multiplexed beam 820 goes to a central point within splitter 840 and may be dispersed simultaneously along the various output paths in the same phase. When splitter 840 is a cable spliced device, however, multiplexed beam 820 may exit from respective output ports of splitter 840 in different phases and amplitudes. For example, the multiplexed beam 822 may exit first. Then, after a short delay, the multiplexed beam 824 may exit. After a further short delay, the multiplexed beam 826 may exit. An additional delay may be present for multiplexed beam 828. Therefore, when a cable spliced device is used for splitter 840, the tuning of each of the photonic crystals 860, 862, 864 may be adjusted to compensate for the respective delays occasioned by splitter 840. Accordingly, photonic crystal 860 may be adjusted to provide the longest delay, photonic crystal 862 may be adjusted to provide a delay that is shorter than photonic crystal 860, and photonic crystal 864 may be adjusted to provide a delay that is shorter than photonic crystal 862.

In an exemplary embodiment, the frequencies of the beams within multiplexed beams 820, 822, 824, 826, and 828 may be gigahertz frequencies and there may be, for example, 6 picoseconds between groups of signals being propagated. Photonic crystals 860, 862, and 864 may be tuned when the appropriate amount of tuning laser light 861 is incident upon them. Laser tuning light 861 is a single pulse of light that is simultaneously incident upon photonic crystals 860, 862, and 864. By fine-tuning the delays of the photonic crystals to compensate for the phase delays attributable to a cable spliced splitter, the pulse of tuning laser light 861 may be lined up with beams 822, 824, and 826 to enable the multiplexed beams being provided from the respective output ports of the photonic crystals may be able to follow a predetermined TDM sequence. To accomplish TDM according to this embodiment, photonic crystals 860, 862, and 864 may have a broad pass band so that when a photonic crystal shifts the delay, the signal it receives from splitter 840 may still be in the pass band. For example, photonic crystal 860 may have a broad pass band so that when photonic 860 shifts the delay of beam 822, beam 822 may still be in the pass band of photonic crystal 860.

Figure 9:
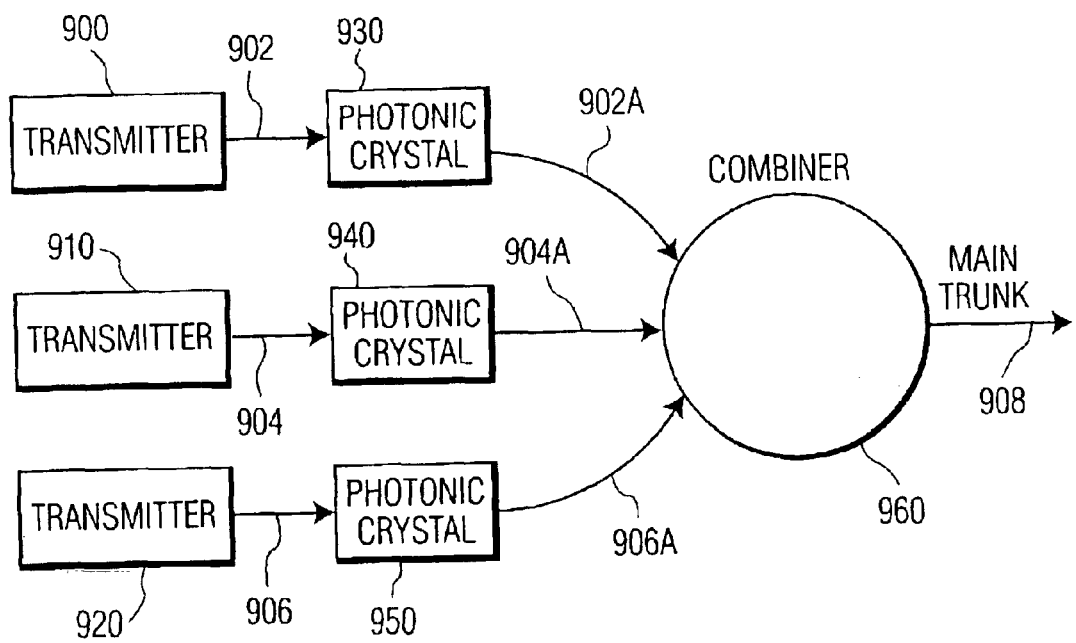
FIG. 9 is a block diagram of a multiplexer using a plurality of photonic crystals.

FIG. 9 is an embodiment of a multiplexer. FIG. 9 shows a first transmitter 900, a second transmitter 910, and a third transmitter 920 transmitting light beams 902, 904, and 906, respectively. Some or all of light beams 902, 904, and 906 may be light of a single wavelength. Alternatively, some or all of light beams 902, 904, and 906 may be light of a different wavelength. As will be understood by those skilled in the art, more or fewer transmitters may be used. Light beams 902, 904, and 906 are incident upon photonic crystals 930, 940, and 950, respectively, each of which may be switched on to transmit light of one or more wavelengths as light beams 902A, 904A, and 906A. When the photonic crystals are switched on, they also eliminate unwanted harmonics and unwanted modes from the transmitted light beams. Photonic crystals 930, 940, 950 may be switched on at the same time to implement a frequency division multiplexer or at different times to implement a time division multiplexer. When one or more photonic crystals are switched on simultaneously, their light output may be incident upon combiner 960 to create a multiplexed main trunk light beam 908.

Although the invention has been described in terms of exemplary embodiments, it is contemplated that it may be practiced as described above with variations within the scope of the appended claims.

What is claimed:

1. A photonic crystal comprising:
    a waveguide made of material, said waveguide having a periodic set of holes;
    wherein the material comprising an annulus around at least one of the holes in the periodic set of holes exhibits an index of refraction that has been temporarily modified relative to the material proximate to other ones of the holes in the periodic set of holes by application of laser energy; and
    the material of the waveguide temporarily exhibits a first molecular structure and the material forming the temporary annulus temporarily exhibits a second molecular structure different from the first molecular structure.

2. A photonic crystal comprising:
    a waveguide made of material, said waveguide having a periodic set of holes:
    wherein the material comprising an annulus around at least one of the holes in the periodic set of holes exhibits an index of refraction that has been temporarily modified relative to the material proximate to other ones of the holes in the periodic set of holes by application of laser energy; and
    diameter of the temporary annulus is in a range of about 1% to about 5% larger than a diameter of the holes.

3. The photonic crystal of claim 1, wherein the molecular structure of the annulus is temporarily an amorphous structure.

4. The photonic crystal of claim 1, wherein the molecular structure of the annulus is temporarily a metallic structure.

5. A method of forming a photonic crystal comprising a waveguide made of material exhibiting an index of refraction, said method comprising the steps of:
    forming a periodic set of holes in the waveguide;
    temporarily modifying the index of refraction of the material proximate to at least one of the holes in the periodic set of holes by applying laser energy to the material proximate to the at least one of the holes in an amount that is less than an optical breakdown threshold level of the material.

6. The method of claim 5, wherein the step of temporarily modifying the index of refraction includes temporarily modifying the index of refraction of an annulus of the material surrounding the at least one of the holes.

7. The method of claim 5, further comprising the step of temporarily creating an annulus around the at least one of the holes, wherein the diameter of the temporary annulus is larger than a diameter of any hole in the periodic set of holes.

8. The method of claim 5, wherein the amount of applied laser energy is in the range of about 0.6 to 0.8 of the breakdown threshold level.

9. The method of claim 5, wherein the amount of applied laser energy is in the range of about 0.8 to 1.0 of the breakdown threshold level.

10. A method of forming a switch comprising a waveguide made of material exhibiting an index of refraction that is reversibly changed by application of laser energy below an optical breakdown threshold level of laser energy of the material, said method comprising the steps of:
    forming a waveguide having a periodic set of holes;
    applying laser energy to the material proximate to at least one of the holes, wherein the amount of applied laser energy is below the optical breakdown threshold level.

11. The method of claim 10, wherein the amount of applied laser energy is in a range of about 0.6 to 0.8 of the optical breakdown threshold level.

12. The method of claim 10, wherein the amount of applied laser energy is in a range of about 0.8 to 1.0 of the optical breakdown threshold level.

* * * * *